May 20, 1969  H. J. McGARA ET AL  3,444,768
STRIP STOCK FEED MECHANISM

Filed May 2, 1967  Sheet 1 of 2

INVENTOR.
HOMER J. McGARA
BY EDWARD B. SPANG

Fran, Wilcox Franz

ATTORNEYS

United States Patent Office 3,444,768
Patented May 20, 1969

---

3,444,768
STRIP STOCK FEED MECHANISM
Homer J. McGara, Cincinnati, and Edward B. Spang, Toledo, Ohio, assignors to Sheller-Globe Corporation, Toledo, Ohio, a corporation of Ohio
Filed May 2, 1967, Ser. No. 635,464
Int. Cl. B26d 5/20; B65h 17/26
U.S. Cl. 83—238                                   7 Claims

ABSTRACT OF THE DISCLOSURE

A feeding mechanism which synchronizes the advance of metal strip stock material into the working area of a metal working machine such as a stamping or punch press with the machine operation such that the material is advanced intermittently at a time when the working faces of the machine are separated from the work upon which they are operating wherein the advances of the strip stock material may be automatically varied during the machine operation.

---

BACKGROUND OF INVENTION

Field of the invention

Apparatus for advancing material of indeterminate length having means for advancing material in a step-by-step manner, including advancing an increment of material and stopping movement of the material wherein a part of the intermittent feeder may be moved volitionally relative to another part of the apparatus to vary the extent of movement of the feeder while moving in contact with the material.

Description of the prior art

In the art of metal working, it has been known that metal working machines, such as stamping or punch presses, which perform repetitive operations on material fed in strip form have been provided with feeding mechanisms which synchronize the advance of the strip stock material into the working area of the machine with the machine operation such that the material is advanced intermittently at a time when the working faces of the machine are separated from the work upon which they are operating. Typically, the feeder mechansisms are driven by means of a reciprocating rack operatively coupled, as by a crank arm, to the main drive shaft of the metal working machine. The advancement of the strip stock material is frequently determined by the stroke of the reciprocating rack. A number of expedients has been employed to adjust the length of the stroke, including that of adjusting the length of the crank arm which imparts reciprocating motion to the rotating drive shaft of the machine. Such adjustments ordinarily involve expedients such as positioning a crank pin on a throw block connected to the drive shaft in a manner to provide a given degree of eccentricity of the pin with respect to the axis of the drive shaft and journalling a drive rod to the crank pin so that reciprocation is imparted to the more remote end of the rod in accordance with the degree of eccentricity of the pin.

None of the known systems is effective to automatically vary the advance of the strip stock material between the working faces of an associated stamping or punch press machine while the machine is operating. This problem is solved by the present invention as will become readily apparent from reading the following detailed description.

SUMMARY

The objects and advantages of the invention are typically achieved by a strip stock feeding mechanism for stamping and other impression machines provided with a die-holding means and rotating means for opening and closing said die-holding means; comprising a frame; at least one pair of cooperating feed rolls mounted in the frame; gear means for driving at least one of the rolls; and longitudinally extendable linkage means operatively connected between the rotating means for opening and closing the die-holding means and the gear means to translate the rotary motion of the rotating means into a reciprocating motion to effect incremental rotation of the feeding rolls, the linkage means including a pressure fluid actuated cylinder and piston assembly, and a source of pressure fluid to selectively extend the length of the linkage along the longitudinal axis thereof.

BRIEF DESCRIPTION OF THE DRAWINGS

Other objects and advantages of the invention, as well as a complete understanding thereof, will become readily apparent to those skilled in the art from reading the following detailed description of an embodiment of the invention when considered in the light of the accompanying drawings in which.

DESCRIPTION OF THE PREFERRED EMBODIMENT

Figure 1:
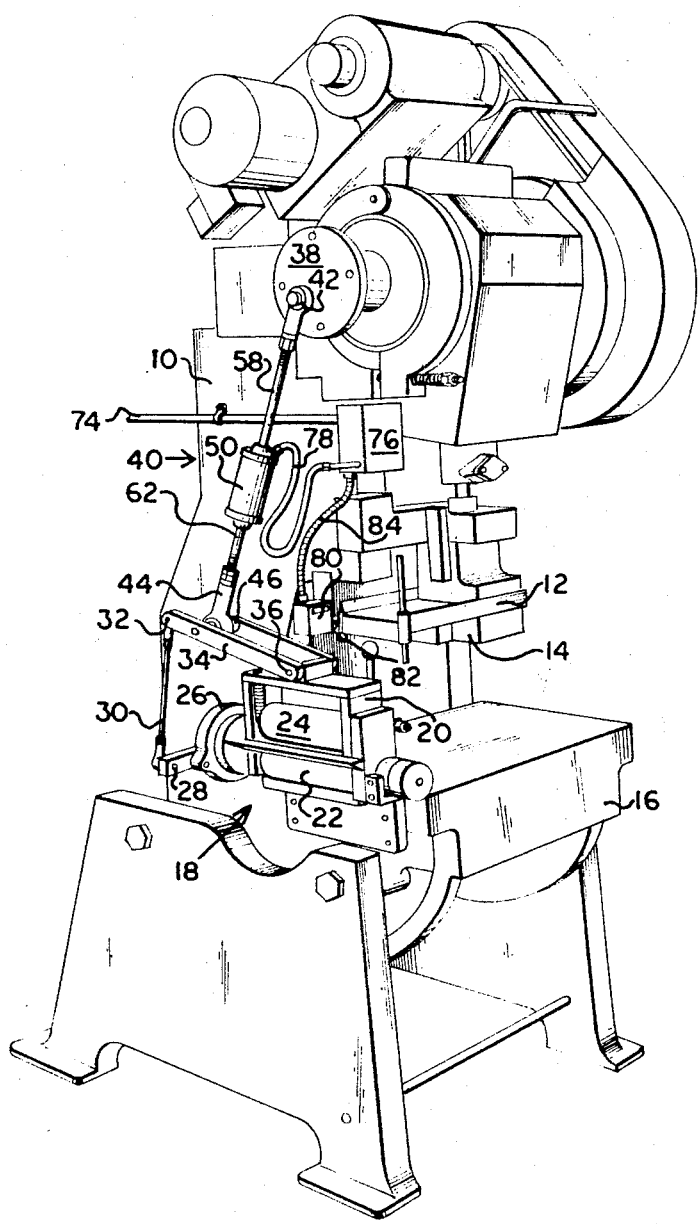
FIGURE 1 is a prospective view of a stamping press machine having a stripped stock feeding mechanism embodying the features of the present invention.

Referring to the drawings, there is shown a mechanically operated stamping or punch press mechanism constructed with a frame 10, as shown in FIGURE 1. A crank shaft and connecting rod, not shown in the figures, are typically included in the upper portion of the press mechanism and are arranged to drive a punch carrier 12 which is in the nature of the crosshead carried in ways in the front upper face of the frame 10. The lower face of the punch carrier 12 is fitted to receive a chuck or the like 14 in which various punches or other tools may be suitably mounted. A bolster 16 is securely mounted from the bottom portion of the frame 10 in such a position that it may support a die plate and die (not shown) in position to cooperate with a work punch or the like (not shown) carried by the chuck 14.

A strip stock feeding mechanism, generally indicated by reference numeral 18, for advancing the strip stock material into the working faces of the punch and the die is represented in general form in FIGURE 1. The feeding mechanism can be of the type manufactured and sold by Carl G. Peterson Company, Box 423–B, R.F.D. 3, Esmond, R.I. and identified as a "Peterson Overarm Drive Roll Feed" which typically comprises a generally U-shaped frame 20 in which feeder rolls 22 and 24 are mounted on heavy shafts (not shown). These rolls are rotated intermittently in timed sequence with respect to the reciprocation of the punch carrier 12 by the rotation of a drive shaft (not shown) which is connected to a pawl and ratchet drive mechanism including a drive wheel 26 connected to one or both of the shafts supporting the feed rolls 22 and 24.

The drive wheel 26 has a radially extending crank arm 28, the outer end of which is pivotally journalled to the lower end of a connecting rod 30. The other or upper end of the connecting rod 30 is pivotally journalled, as at 32, to one end of a pivotally mounted frame 34. The other end of the frame 34 is pivotally mounted to the upper portion of the frame 20, as at 36. In accordance with the invention, the frame 34 is connected to a throw block 38 mounted on the end of the crank shaft of the press machine, by means of a longitudinally extendable linkage, generally indicated by reference numeral 40. The upper end of the longitudinally extendable linkage 40 is provided with a journal fitting 42 pivotally connected to a journal on the throw block 36 mounted on the end of the crank shaft of the press. The lower end of the longitudinally extendable linkage is provided with a journal fitting 44 pivotally connected to a journalling pin 46 of the mounted frame 34.

Figure 2:
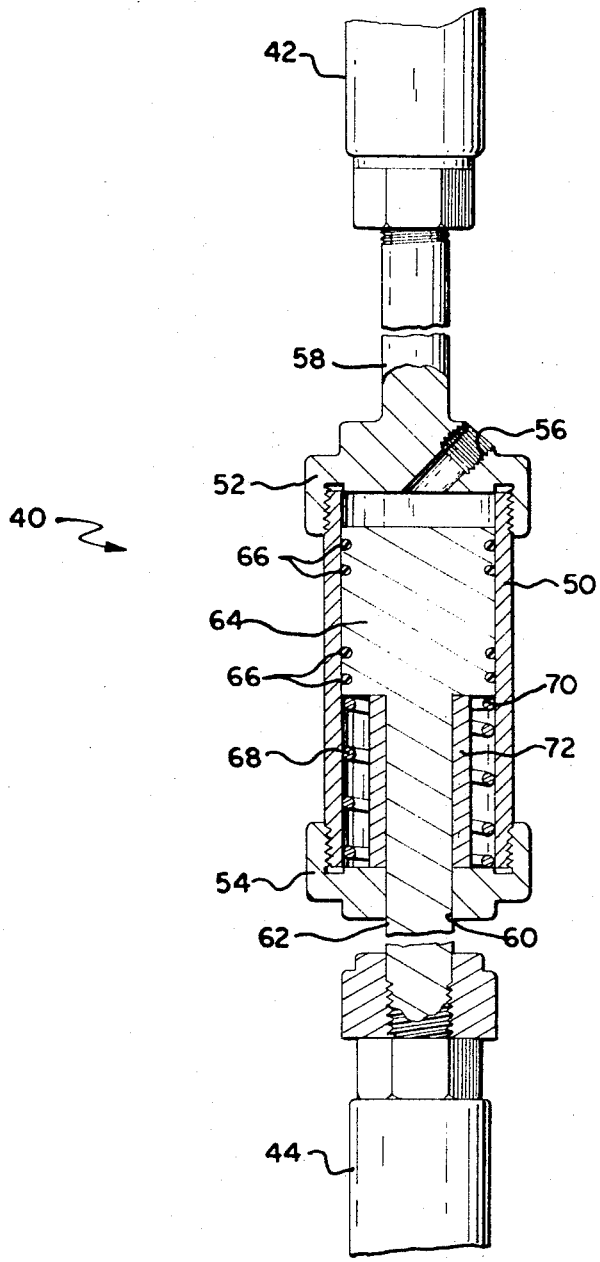
FIGURE 2 is an enlarged fragmentary sectional view of the longitudinally extendable linkage of the invention.

The longitudinally extendable linkage 40, as clearly illustrated in FIGURE 2, includes a pressure fluid actuated cylinder consisting of a hollow cylindrical housing 50 having external threaded portions formed at opposite ends thereof, to receive an internally threaded upper end cap 52 and an internally threaded lower end cap 54, respectively. The upper end cap 52 is provided with an externally threaded port 56 and an upwardly extending shaft 58 having an externally threaded free end for threaded engagement with the upper end journal fitting 42. The lower end cap 54 is provided with a centrally disposed aperture 60 to receive a shaft 62 which is integral with and depends from a piston 64. The outer peripheral wall of the piston 64 is provided with a plurality of axially spaced sealing rings 66 which are adapted to cooperate with the interior wall of the hollow cylindrical housing 50 to produce a sliding sealing relation therebetween. The lower free end of the shaft 62 has an externally threaded portion for threaded engagement with the lower end journal fitting 44.

The piston 64 is normally urged by a helical spring 68 against the inner surface of the upper end cap 52. The size of the spring 68 is chosen such that the force exerted thereby is greater than the force required to operate the ratchet drive assembly of the strip stock feeder mechanism. In FIGURE 2, the piston 64 is shown in an extended position wherein the spring 68 has been compressed and the bottom surface 70 of the piston 64 is in contact with the upper end of a sleeve 72. The piston 64 is typically caused to be moved to the position illustrated in FIGURE 2 by the introduction of a pressure fluid into the cylinder through the port 56, in a manner such as will be described in greater detail hereinafter.

A pressure fluid, such as compressed air or oil, may be selectively introduced into the cylinder 50 through the port 56 from suitable source (not shown) through a line 74, a solenoid actuated valve 76, and a flexible line 78, as illustrated in FIGURE 1. Normally, the piston 64 is held in its retracted position by the helical spring 68 to cause the longitudinally extendable linkage 40 to be in its shortest position thereby effecting the shortest distance between the eccentrically disposed journal fitting 42 connected to the throw block 36 and the pivotally mounted frame 34. In this condition, each rotation of the throw block 36, the feed rolls 22 and 24 are caused to be indexed a given amount to in turn effect a given degree of advancement to strip being fed therebetween.

As mentioned above for each rotation of the throw block 36, through the cooperative effort of the ratchet drive wheel 26, linkage 30, pivotal frame 34, and the longitudinally extendable linkage 40, the feed rolls 22 and 24 will be rotated a given degree to advance the associated strip stock material into the working area of the machine at a time when the working faces thereof are separated. If it be assumed that a die assembly were being employed in the press machine and that at each ten cycles it were desired to advance the stock a greater degree, an electrical counter 80 having a feeler arm 82 is employed. The feeler arm 82 is positioned to be contacted by the punch carrier 12, for example, during each reciprocation thereof. When the counter 80 has registered the required number of counts, a signal is sent to the solenoid valve 76 through a suitable conductor 84 to cause the valve to open and automatically admit pressure fluid into the cylinder 50 through the conduit 78. The pressure fluid causes the piston 64 to move against the bias of the spring 68 until the bottom surface 70 of the piston contacts the sleeve 72. When the piston 64 is thus extended, the length of the linkage 40 is increased, causing the linkage 30 to effect a greater rotational movement of the ratchet drive wheel 26 of the pawl and ratchet drive assembly causing a proportionally greater rotational movement of the feed rolls 22 and 24 to provide for a greater feed increment of the associated strip stock material.

Typically, the solenoid 76 is then de-energized allowing the pressure fluid within the cylinder housing 50 to be vented to the atmosphere or to be returned to a reservoir in the case of oils or other non-compressible fluids. As the pressure fluid leaves the cylindrical housing 50, the spring 68 simultaneously forces the piston 64 to return to its normal piston thereby retracting or reducing the overall length of the linkage 40 and correspondingly reducing the feed increment of the feed rollers 22 and 24.

While the preferred embodiment of the invention employs a pressure fluid to extend the overall length of the linkage 40 and a spring 68 to return the linkage 40 to a shorter overall, it will be understood that a pressure fluid could also be employed to force the piston in each direction thereby eliminating the function of the spring 68.

It can be readily understood that by the above-described invention, the strip stock feed mechanism can be readily and automatically adjusted while in operation to vary the length of the feed increment by the setting of a counter mechanism which will energize an associated solenoid valve for any given number of duty cycles of the associated press machine.

Further, the amount of lengthening of the longitudinally extendable linkage 40 can be varied by the size of the sleeve 72. It will be readily apparent that if the sleeve 72 were shortened, the increase in the feed increment during periods of extension of the linkage 40 would be increased proportionally.

According to the patent statues, we have explained the principles and mode of operation of our invention, and have illustrated and described what we now consider to represent its best embodiment. However, we desire to have it understood that, within the scope of the appended claims, the invention may be practiced otherwise than as specifically illustrated and described.

What we claim is:

1. A strip stock feeding mechanism for stamping and other impression machines provided with a die holding means and rotating means for opening and closing said die holding means; comprising a frame; at least one pair of cooperating feeding rolls rotatably mounted in said frame; gear means for driving at least one of said rolls; and longitudinally extendable linkage means operatively connected between said rotating means for opening and closing said die holding means, and said gear means to translate the rotary motion of said rotating means into reciprocating motion to effect incremental rotation of said feeding rolls, said linkage means including a pressure fluid actuated cylinder and piston assembly and a source of pressure fluid communicating with said cylinder to selectively extend the length of said linkage along the longitudinal axis thereof.

2. The mechanism defined in clami 1 including spring means for normally biasing said piston into a retracted position.

3. The mechanism defined in claim 2 wherein said spring means is a helical spring disposed within said cylinder.

4. The mechanism defined in claim 3 including a valve between said cylinder and said source.

5. The mechanism defined in claim 4 wherein said valve may be selectively energized.

6. The mechanism defined in claim 5 wherein said valve includes a solenoid actuator.

7. The mechanism defined in claim 6 including an adjustable counter apparatus for counting the opening and closing of said die holding means of said impression machine and at predetermined number of counts to energize said solenoid actuator of said valve.

References Cited

UNITED STATES PATENTS

| | | |
|---|---|---|
| 3,099,180 | 7/1963 | Munschauer et al. ___ 83—244 X |
| 3,388,625 | 6/1968 | O'Brien et al. _____ 83—238 |

JAMES M. MEISTER, *Primary Sxaminer.*

U.S. Cl. X.R.

83—244; 226—123, 142